United States Patent Office 3,037,445
Patented June 5, 1962

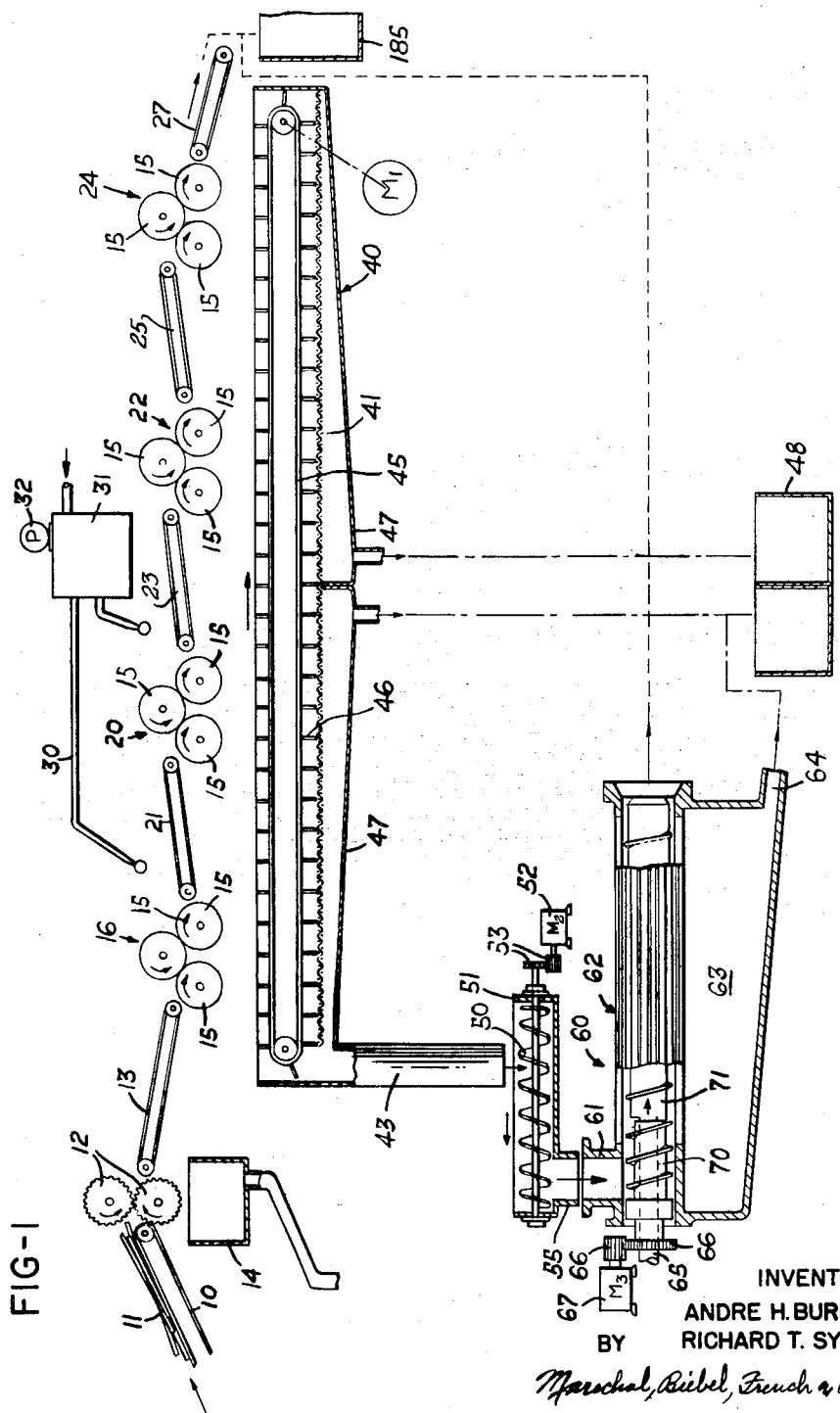

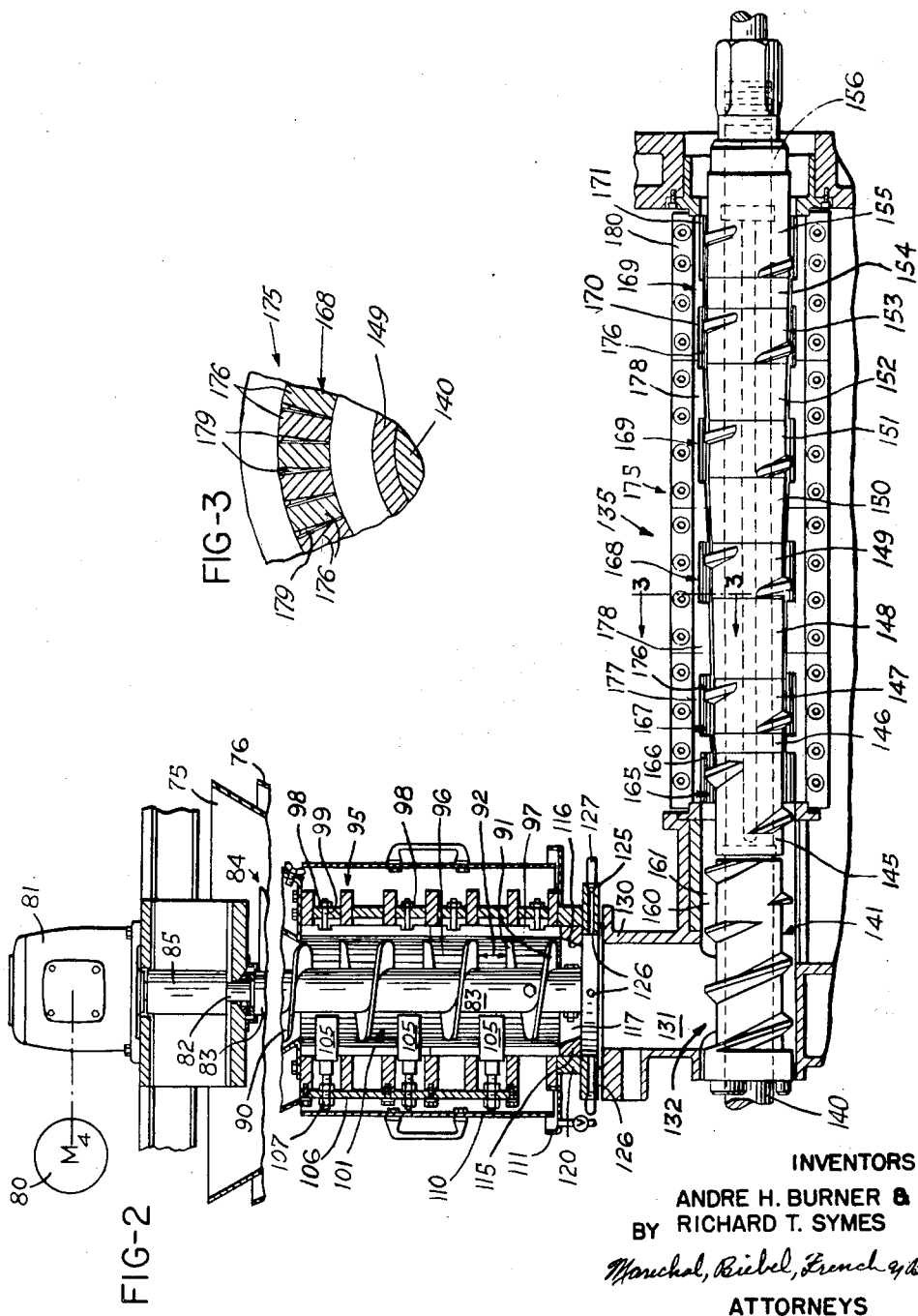

3,037,445
RECOVERY OF JUICE FROM SUCROSE BEARING MATERIALS
Andre H. Burner and Richard T. Symes, Piqua, Ohio, assignors to The French Oil Mill Machinery Company, Piqua, Ohio, a corporation of Ohio
Filed July 9, 1957, Ser. No. 670,742
7 Claims. (Cl. 100—72)

This invention relates to a method and apparatus for expressing liquids from moisture containing fibrous materials and more particularly to improvements in the method and apparatus for expressing sacchrinous juice from sucrose bearing fibrous materials such as sugar cane and the like.

The recovery of sacchrinous juice from sugar cane, sorghum and other related canes, is usually accomplished by running the cane through one or more roller mills having opposed pressure applying rolls which compress and crush the cane as it passes between them to free the juice therefrom. As juice is freed it is delivered into receptacles positioned beneath the various rolls and drained to a storage tank for subsequent dehydrating and purifying procedures to recover the sucrose content.

An ancillary result of crushing cane in roller mills is the resultant separation of fibers of varying sizes from the body or stalk of the cane. These fibers, which are referred to in the sugar industry as "cushcush," or more commonly as "bagacillo," and often by the generic term "trash," are normally taken from the rolls and fed back onto the oncoming cane to be rerun through the mills. While recycling of the fibers, which will hereinafter be referred to as trash fibers, provides a means for recovering the juice therefrom, the recycling is disadvantageous in that it increases the inherent danger of bacteria concentration occurring as well as often causing a decrease in the efficiency of the milling operation due to increased power consumption resulting from slippage between the rolls and the cane. Slippage also causes wearing of the rolls which brings about increased maintenance costs. The increased slippage is occasioned by the decreased frictional values between the cane and the rolls caused by the wet, slippery trash fiber.

It is therefore a principal object of this invention to provide an improvement in the process of recovering sacchrinous juices from sucrose bearing fibrous materials which includes recovery of the juice content of the trash, distinct from said mills, thus eliminating the undesirable side effects caused by recycling of these fibers.

Another object of the present invention is to provide novel apparatus for recovering sacchrinous juice from sucrose bearing fibrous material according to the improved process.

Other objects and advantages of the present invention will be apparent from the following description, the accompanying drawings and the appended claims.

In the drawings:

FIG. 1 is a somewhat schematic side view of the apparatus used to effect the improvements in the process of recovering juice from sucrose bearing fibrous materials;

FIG. 2 is a sectional side view, showing the constructional details of a feeding and expressing press used to recover juice from trash fiber; and FIG. 3 is a slightly enlarged fragmentary view taken substantially along the line 3—3 of FIG. 2.

The present invention is described with particular reference to the treatment of trash fiber. Related apparatus and method for specific application in recovering increased quantities of sucrose for sucrose bearing fibrous materials generally, for example sugar cane, sorghum, beets and the like, are described and claimed in copending application Serial No. 670,743, filed of even date herewith and assigned to the same assignee as the present application.

Referring to the drawings which illustrate a preferred embodiment of apparatus used for effecting the present process, a conveyor 10 delivers raw cane 11 to opposed crushing rolls 12 which have serrated or otherwise suitably formed working surfaces to break the cane and deliver it onto a second conveyor 13 with 40% to 70% of the original juice content removed therefrom. The juice taken from the cane at this point can be collected in a receptacle 14 for subsequent handling or it can be combined with juice extracted in later operations. The second conveyor, 13, is positioned to discharge the chushed cane into the nip of the mill rolls 15 of mill 16. Cane is often referred to as bagasse after the initial crushing operation but for the present discussion bagasse will signify only the cane product remaining after the final compressing or expressing operation. From mill 16 the cane passes through the rolls of mills 20, 22 and 24 by means of conveyors 21, 23 and 25 and is finally delivered onto a discharge conveyor 27 as bagasse having from about 85% to 95% of its sucrose content removed. The recovery of such high percentages of sucrose is made possible by the addition of a suitable maceration liquid, such as water, to the cane through fluid conducting pipes 30 prior to its delivery to mills 16 and 20. Fluid can be obtained from tank 31 which is under pressure from pump 32. The use of maceration liquids in this manner is done by procedures standard in the sugar industry and will therefore not be outlined in any greater detail.

Use of the mill rolls as outlined above results in progressively more severe working of the cane as it travels from mill to mill and causes, or results in, the formation of loose fibers which are liberated from the body of the cane. These trash fibers contain relatively high percentages of sucrose, due at least partially to the fact that they soak up free juice as they leave the mills, making recovery of the juice from the trash a matter of economic importance.

The juice and the trash are freed from the cane and fall simultaneously into a filtering means 40 which is positioned at a location removed from the mills to separate the juice from the trash for transmission to a point of collection. The actual separation of the two materials may be effected by a screen 41 of suitable mesh or by other suitable alternative filtering devices like a perforated plate.

As the trash is retained by the screen 41, it is collected an moved toward a spout-like opening 43 by means of a flexible conveyor 45 which is driven by a motor $M_1$ and has a plurality of outwardly extending paddles or scrapers 46. The thus collected trash is then discharged from spout 43 while the juice continues through screen 41 into the divided bottom 47 for discharge into a divided collection receptacle 48. The partitioned collection receptacles permit separation of the relatively sucrose-rich juice that is taken from the cane during the initial compacting from the sucrose-lean juice that is removed later.

From spout 43 the trash enters a feeding device including a spiral screw 50 which is rotatably mounted in collecting trough 51. The trough 51 is open at the top to readily receive trash from spout 43 and has the longitudinally extending shaft of screw conveyor 50 journaled in each end thereof, one end of the shaft extending completely through trough 51 for driving engagement with motor 52 through gears 53. The opposite end of trough 51 i.e. that end removed from the outlet opening of spout 43 has an outlet 55 extending downwardly therefrom which provides for passage of trash from the interior of trough 51 to a screw type expressing press 60 which has its inlet 61 positioned beneath the outlet 55 of trough 51.

In addition to inlet 61, press 60 has a rather elongated expression cage 62 having drainage openings in the walls thereof and a juice collecting chamber 63 having an outlet opening 64 through which the juice flows for transportation to divided collecting receptacle 48.

A longitudinally extending shaft 65 extends through cage 62 and is drriven, through gears 66, by a driving motor 67. That portion of the shaft which extends through the press has a feed screw 70 and a compacting screw 71 mounted on the shaft for rotation therewith.

FIG. 2 of the drawings illustrates a preferred type of expressing apparatus in which the trash received from spout 43 (FIG. 1) can be subjected to a double pressing action with the addition of a maceration liquid intermediate the successive pressing steps. In this instance, trash from spout 43 enters feeding means including a generally cone-shaped hopper 75, surrounded by a similarly shaped cover 76. A driving motor 80 is positioned above hopper 75 and has its drive shaft connected to a gear box 81 while the output shaft 82 of the gear box is in turn connected to the shaft 83 of a screw conveyor 84 through a connecting spline sleeve 85. The upper portion of shaft 83 carries a continuous spiral feeding vane 90, the center portion of which has been broken away as indicated on the drawing, for moving material through hopper 75 while that portion of shaft 83 extending below the lower limit of the hopper carries a series of interrupted feeding vane flights 91 which have spaces 92 between the adjacent ends of successive flights.

A substantially vertically disposed expression cage 95 surrounds the lower portion of shaft 83 and the interrupted vane flights 91 and includes a plurality of vertically disposed radially spaced screen bars 96. Screen bars 96 are held in position by wedge bars 97, the wedge bars being adjustably secured to cage 95 by nuts 98 which are mounted on the threaded end portions of the outwardly extending shanks 99 of the wedge bars 97. Screen bars 96 are separated by suitable spacers to define fluid drainage openings between adjacent bars so that expressed juice can flow outwardly from the expression chamber 101 formed by the surrounding bars.

Extending through screen bars 96 to the chamber 101 are a number of vertically spaced breaker bars 105 which are adjustably secured to cage 95, through holding strip 106, by means of threaded fasteners 107. The threaded fasteners 107 on the outer ends of the breaker bars provide means for adjusting them radially into or out of the chamber 101 within the vertical spaces 92 between interrupted vane flights 91 to stop rotary movement of material present in the chamber and cause it to move axially downwardly therethrough. For a detailed description of the aforementioned type of expression cage and breaker bar arrangement reference is made to copending application Serial No. 631,698, filed on December 31, 1956 now abandoned and assigned to the same assignee as the present application.

Expression cage 95 is enclosed within an imperforate wall 110 which receives any liquid from the material passing down through the cage and directs the liquid downwardly to a collecting trough 111 adjacent the lower end of the cage structure where it can be withdrawn for collection in a suitable receptacle.

A ring like split cone 115 is positioned adjacent the inner end of expression cage 95 and has a tapered inner surface 116 which defines a restricting orifice 117 of less diameter than the inner diameter of cage 95. A clamping ring 120 surrounds split cone 115 to maintain the two halves thereof in their assembled position. By using a split cone and clamping ring in this manner, i.e., as a unit separate from the cage 95, it is possible to easily and quickly change the size of restricting orifice 117 simply by substituting a split cone having the desired size orifice. This adjustability is desirable where various materials are run through the apparatus at different periods of time.

An infusion manifold 125 having a plurality of radially disposed inwardly directed nozzle like openings 126 (FIG. 2) is positioned for directing maceration liquid into the material as it leaves the lower limit of restricting orifice 117. Manifold 125 is provided with a number of intake openings 127, these openings being adapted for connecting with any suitable source of maceration liquid. For a more complete description of the infusion manifold 125 reference is made to applicant's copending application Serial No. 645,165, filed March 11, 1957.

Beneath restricting orifice 117 a vertically extending wall 130 defines a further chamber 131, of greater diameter than the orifice where the trash is permitted to expand upon dropping into the press inlet chamber 132 of an interrupted flight screw type expressing press 135.

A longitudinally extending shaft 140, which can be driven by any suitable power means, has a feed screw 141 mounted thereon which surrounds a portion of the shaft and extends longitudinally through inlet chamber 132. Following feed screw 141, a plurality of alternately arranged screw flights 145, 147, 149, 151, 153 and 155 and pressure collars 146, 148, 150, 152 and 154 and a final discharge collar 156, are all keyed or otherwise attached to the shaft 140 for rotation therewith.

A preliminary expression cage 160 begins at vertically extending wall 130 and surrounds a portion of feed worm 141 and screw flight 145 to define a preliminary expression zone 161. At the termination of preliminary expression zone 161 there is an inlet opening to a main expression chamber 165. A plurality of screen bar sections 166, 167, 168, 169, 170 and 171 make up an expression cage 175, and the aforementioned alternately arranged screw flights and pressure collars are located inwardly thereof.

Expression cage 175 (FIGS. 2, 3) includes screen bars 176 with drainage openings between them like those of pressure cage 95, and breaker bars 177, which have a plurality of lonigtudinally and radially extending lugs 178 terminating just short of the outer surface of pressure collars 146, 148, 150, 152 and 154 to cause primarily longitudinal movement of trash over these collars without the presence of excessive rotary motion. Spaces 179 allow for fluid movement past the screen bars 176. Reinforcing structure 180 is present to strengthen the screen bar sections since large radial forces are exerted against them when the press is operating.

Generally the present process comprises, considering the milling apparatus of FIG. 1 combined with the expressing apparatus of FIG. 2, taking trash fiber from the mills 16, 20, 22 and 24 as the cane passes through them following an initial crushing in the crushing rolls 12. As juice is expressed from the material in each of the mills it falls concurrently with the trash fiber being removed from the rolls 15 into the filtering apparatus 40 where the trash is collected by screen 41 for movement by flexible conveyor 45. The collected trash then discharges through spout 43 into the hopper 75 for entry into the first expressing cage 95. In passing through this cage and the restricting orifice at the lower end thereof, the material is compressed and loses a quantity of juice through the openings between the cage bars.

Upon leaving the restricting orifice 117 formed by collar 115 the trash is treated with maceration liquid being supplied by means of manifold 125 as it is expanding. By treating the material with liquid as it is expanding it is much more receptive to the absorption of the liquid, thereby achieving quicker and greater penetration into the material insuring a thorough wetting of all the trash. The trash then falls into further chamber 131 where the mechanical pressure exerted against it is completely relaxed and it enters into the second and final expressing press 135.

From further chamber 131 the feed worm 141 moves the material longitudinally toward the press inlet. Since feed worm 141 is driven at a higher rate of speed than the press screw flights the trash is once again compacted, this time within the preliminary expression cage 160. This second compacting achieves a second expression of juice from the trash, the juice flowing outwardly through the cage from preliminary expression zone 161.

The first screw flight 145 takes the compacted trash from cage 160 and moves it inwardly toward pressure collar 146 in a generally helical path which creates a defibering action under pressure with mixing of the trash fibers to achieve a reorientation thereof. Reorientation contributes to further expression of juice as the material is forced over the collar 146, where a crushing or expressing action occurs. Screw flight 147 operates in much the same manner as screw flight 145 in that it takes compacted material from an expressing zone, viz., that zone between collar 146 and screen bar section 166, and defibers and mixes the fibers while moving them onward toward collar 148. The worms and collars following worm 147 and collar 148 operate on the trash in the same manner and the trash is finally discharged from the outlet end of the press.

While the precise conditions developed in the expression cage are not fully understood, largely because of the practical difficulties of accurately determining the pressure and other conditions at a series of points throughout the cage, it is believed that the action may be described generally along the following lines. As the trash is fed forwardly by the flights on the feed worm portion, it is packed into the first screw flight portion and because of the differences in the rate at which such flights are driven, a substantial pressure is developed on the trash in such first flight. This is accompanied by expression of juice through the screen bars and additional pressure is built up as the trash passes over the first collar, and its rotation is interrupted by the breaker bars. This is accompanied also by a mechanical action which results in some defibering and reorientation, with the result that further juice is extracted and the fibers are advanced to the next flight which they encounter with a different distribution.

As the material continues to pass through the cage, it encounters successive interrupted flights alternating with the series of collars and breaker bars so that such crushing, defibering and reorienting occur successively. It will further be noted that the clearance on the next flight between the body of the flight and the inner periphery of the cage is less than that of the other flights, thus resulting in an increased pressure when the material reaches the discharge end. This not only contributes to a higher effective yield but also assures the more thorough working of the material to express the maximum amount of juice therefrom before it is finally discharged.

Since the main pressure exerted on the trash material is between the pressure created by the pressure collars it is apparent that pressures below the main pressure are exerted while the material is being mixed and defibered and pressures above the main pressure are used when compacting the material to express juice therefrom. Additionally, the main pressure is ascendant because of the increased pressures created toward the outlet end of the press. Thus the fibers are pressed under a sustained mechanical pressure throughout their passage through the press to free juice therefrom.

Upon completion of the final pressing operation the trash bagasse may then be returned to the main body of bagasse exiting from the roller mill 24 for collection in receptacle 185. Since the trash bagasse has been severely pressed it is lower in moisture content than the cane bagasse exiting from roller mill 24 and therefore has a somewhat higher fuel value. The addition of the trash bagasse to the cane bagasse makes the final, composite bagasse of somewhat increased fuel value also.

In tests conducted, using the present method and apparatus, trash fibers having an initial juice content of 87.5%, a fiber content of 12.5% and a sucrose content of 9.52% were fed into the apparatus at the rate of 8 to 10 tons per hour to recover additional juice and sucrose therefrom. The results obtained are listed in Table 1 below with the sucrose and moisture being indicated by the weight percentages of these constituents remaining in the pressed trash bagasse.

*Table-I*

| Test No. | Sucrose | Moisture | Test No. | Sucrose | Moisture |
|---|---|---|---|---|---|
| 1 | 3.84 | 36 | 8 | 4.16 | 32 |
| 2 | 2.26 | 35 | 9 | 4.07 | 32 |
| 3 | 3.89 | 35 | 10 | 3.70 | 32.5 |
| 4 | 4.73 | 35 | 11 | 3.75 | 32 |
| 5 | 1.60 | 33 | 12 | 2.45 | 32 |
| 6 | 2.39 | 32 | 13 | 4.33 | 33 |
| 7 | 2.27 | 28 | 14 | 2.70 | 37 |

The average sucrose percentage of all the tests conducted was 3.29 and the average moisture percentage of all the tests conducted was 33.21, these figures meaning that in order for a mill to accomplish the same recovery it would have to average 2.51% sucrose and 49% moisture in the bagasse. Test results on similar material run through an ordinary mill give final values of 3.13% sucrose and 49% moisture, clearly indicating that the present invention accomplishes recovery of significant quantities of sucrose from the trash material which cannot be obtained by an ordinary mill.

While the process and form of apparatus herein described constitute preferred embodiments of the invention, it is to be understood that this invention is not limited to this precise process and forms of apparatus and that changes may be made therein without departing from the scope of the invention which is defined in the appended claims.

What is claimed is:

1. An apparatus for expressing juice from sucrose bearing fibrous material such as sugar cane and the like comprising in combination, a plurality of roller mills each having rolls for crushing said cane to free juice therefrom for collection remote from said mills, means for passing said cane serially through said mills, said crushing causing the formation of cush-cush and resulting in the combination of cush-cush entrained in the juice separated from the crushed cane, means collecting said cush-cush and juice from said mills at a point removed from said mills including apparatus operating to separate said cush-cush from the juice, a screw type expressing press having drainage openings in the side walls thereof of sufficiently small size to prevent passage of substantial amounts of said cush-cush therethrough, means for conveying such collected cush-cush from said separating apparatus into said press, means in said press for exerting a sustained high mechanical pressure on said cush-cush to express juice therefrom through said drainage openings in said press walls, and means adapted to discharge said cush-cush from said press separately from the juice expressed therefrom.

2. Apparatus for expressing juice from sucrose bearing fibrous material, comprising roller mills operative to crush the cane and thus to free and to separate juice from the cane together with cush-cush entrained in such juice while discharging bagasse from which the juice and cush-cush is removed, means receiving only such freed juice and cush-cush and operative to separate said cush-cush from the juice, a screw type expressing press capable of exerting a sustained high mechanical pressure on the cush-cush and having drainage openings sufficiently small to pass juice while retaining cush-cush fiber in said press, and means feeding only the separated juice-soaked cush-cush into said press for expression of juice and discharge of the cush-cush fibers from which essentially all juice has been expressed.

3. Apparatus as defined in claim 2 including means in said press for defibering said cush-cush under said sustained high mechanical pressure to promote the expression of juice therefrom.

4. Apparatus for expressing juice from sugar cane and the like, comprising a plurality of serially arranged and connected roller mills operative to crush the cane releasing freed juice and cush-cush entrained in such juice and discharging from the last mill cane bagasse from which a substantial proportion of the juice has been removed, means receiving the bagasse from said last of said roller mills, means receiving only the freed juice and entrained cush-cush and operative to separate said cush-cush from the juice, a screw type expressing press capable of exerting a sustained high mechanical pressure on the cush-cush and having juice drainage openings sufficiently small to retain substantial quantities of cush-cush fiber in the press for discharge therefrom separate from the expressed juice, and means feeding the separated juice-soaked cush-cush from said separating means into said press for expression of the juice therefrom and for discharge of cush-cush fiber from which juice has been expressed and which may be combined with the cane bagasse from the roller mills.

5. Apparatus as defined in claim 4, wherein said press includes an entrance hopper with drainage openings therein and arranged to receive the juice-soaked cush-cush, a main press cage connected to receive cush-cush from said hopper, a feed worm rotatable in said hopper and operating to express an initial quantity of juice from the cush-cush, and means forming a restricted outlet from said hopper through which the cush-cush passes into said main press cage to create back pressure in the cush-cush being propelled and pressed by said feed worm.

6. Apparatus as defined in claim 5, including an infusion manifold immediately downstream of said restricted outlet providing for the addition of maceration fluid to said cush-cush subsequent to the initial expression of juice therefrom.

7. Apparatus as defined in claim 6 wherein said press includes means for effecting a mixing and defibering action upon the cush-cush therein under said sustained high mechanical pressure to work the maceration fluid through said cush-cush and promote the expression of juice therefrom.

References Cited in the file of this patent
UNITED STATES PATENTS

| | | |
|---|---|---|
| 239,222 | Burgess | Mar. 22, 1881 |
| 254,575 | Soule | Mar. 7, 1882 |
| 989,876 | Rosenow | Apr. 18, 1911 |
| 1,627,284 | Hall | May 3, 1927 |
| 1,775,830 | Reynolds | Sept. 16, 1930 |
| 2,061,196 | Hymers | Nov. 17, 1936 |
| 2,098,110 | Schertz et al. | Nov. 2, 1937 |
| 2,149,017 | Gordon | Feb. 28, 1939 |
| 2,149,736 | Hiller et al. | Mar. 7, 1939 |
| 2,355,091 | McDonald | Aug. 8, 1944 |
| 2,687,084 | Bowman | Aug. 24, 1954 |